July 27, 1954 — H. P. SCHULTZ — 2,684,752
CONVEYER FOR CORN CUTTING MACHINES
Filed Sept. 15, 1951 — 2 Sheets-Sheet 1

INVENTOR.
HAROLD P. SCHULTZ
BY John W. Michael
ATTORNEY

July 27, 1954  H. P. SCHULTZ  2,684,752
CONVEYER FOR CORN CUTTING MACHINES

Filed Sept. 15, 1951  2 Sheets-Sheet 2

INVENTOR.
HAROLD P. SCHULTZ
BY John W. Michael
ATTORNEY

Patented July 27, 1954

2,684,752

UNITED STATES PATENT OFFICE 2,684,752

CONVEYER FOR CORN CUTTING MACHINES

Harold P. Schultz, Two Rivers, Wis., assignor to Schultz Sweetman, Inc., Two Rivers, Wis., a corporation of Wisconsin Application September 15, 1951, Serial No. 246,798

5 Claims. (Cl. 198—195)

This invention relates to corn cutting machines and particularly to conveyor apparatus for feeding corn to the cutting machine. The present structure is particularly adapted for use in connection with machines of the type shown in Cover Patent No. 2,332,894, for example, wherein a corn cob enters an opening at either end of the machine and momentarily rests on top of two holding members which separate at the proper moment to drop the cob between the members which then hold the cob in alignment with a reciprocating ram which pushes the cob through the cutter head at the end of the machine.

In such cutting machines the corn has been placed in the openings by hand. When the operator adapts his movements to the timing of the machine the operation is fairly steady. However, since the machine is dependent upon proper timing any deviation in the operator's timing results in failing to cut a cob on a stroke of the pusher or in jamming the machine when a cob is placed in the machine late and does not drop far enough before the holding members close. In either event production suffers and it is desirable to provide more effective means for supplying the machine.

The principal object of this invention is to provide a conveyor apparatus for supplying corn to cutting machines of the type described at properly timed intervals.

Another object is to provide a conveyor flight which properly spaces the cobs and may be cleaned easily.

Other objects and advantages will be pointed out in, or be apparent from, the specification and claims, as will obvious modifications of the single embodiment shown in the drawings, in which:

Figures 1, 2:
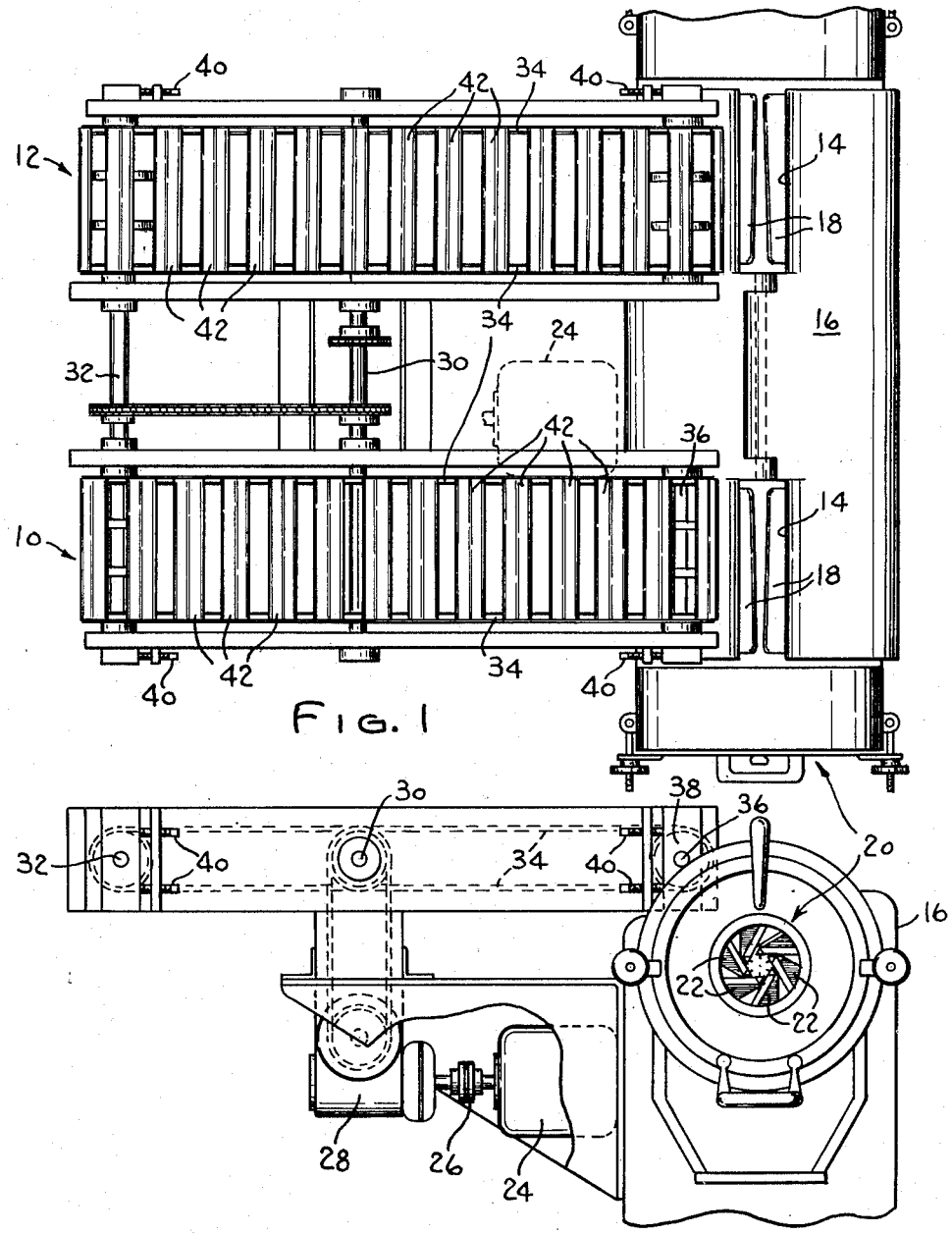
Fig. 1 is a top view of the conveyors feeding the cutting machine.
Fig. 2 is a front view of Fig. 1.
Figure 3:
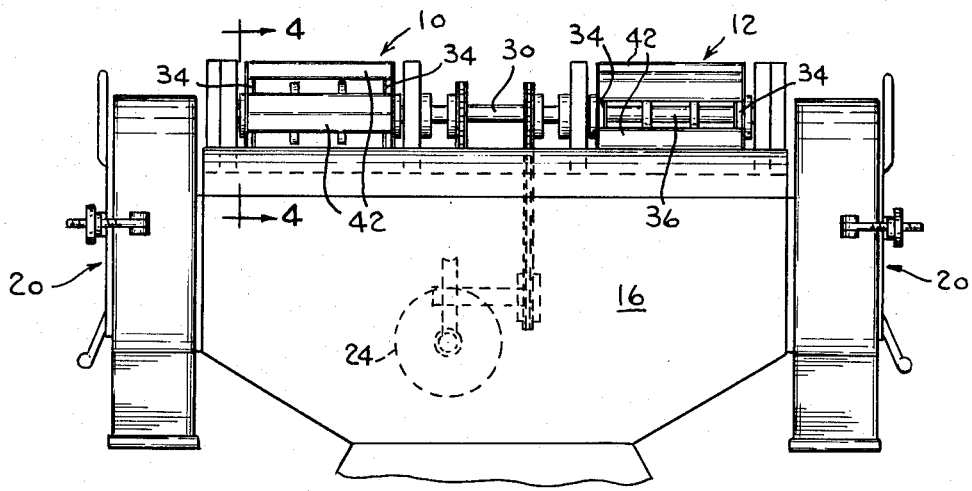
Fig. 3 is an end view of Fig. 1.

Referring to the drawings in detail, Figs. 1 through 3 show the manner in which conveyors 10, 12 feed corn cobs into the openings 14 at each end of the cutting machine 16. Positioned immediately below each opening 14 is a pair of members 18 which momentarily support the cob and then move a part to drop the cob between the members, whereupon the members move inwardly again to hold the cob in longitudinal alignment with the pusher which ejects the cob through the central opening in the cutter head 20. The knives 22 in the cutter head are self-adjusting within a limited range to take a variety of cob sizes and strip the corn therefrom without cutting into the cob proper. It will be appreciated that since the pusher reciprocates along the longitudinal axis of the machine it alternately acts on the cobs at each end. Further details of such cutting machines per se may be seen in said Cover patent.

The cutting machine is driven by an electric motor 24 which also drives the conveyors through coupling 26, speed reducer 28 and the chain and sprocket drive from the speed reducer through jack shaft 30 to drive shaft 32 which carries sprockets engaging the conveyor chain 34. The bearing supports for the drive shaft 32 and idler shaft 36 supporting sprocket 38 are adjustable by means of nuts 40 to vary the tension on the chain. Since the same motor drives the cutting machine and the conveyors and since the conveyors are driven through a slip-free drive, the conveyors must remain in synchronism with the cutting machine and must deliver corn to the openings at the proper moment. It will be noted that the flights 42 on the two conveyors are staggered so that the conveyors deliver corn to the openings alternately.

Figure 4:
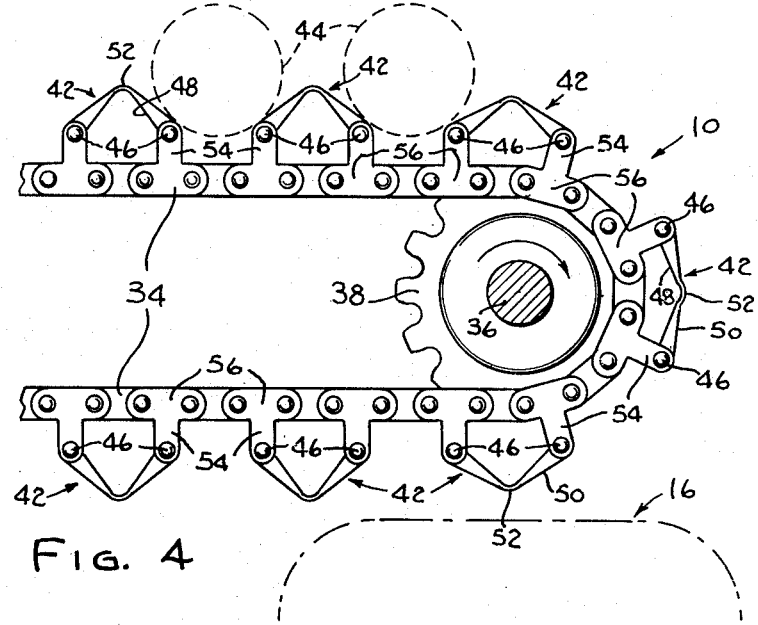
Fig. 4 is an enlarged view of the conveyor.
Figure 5:
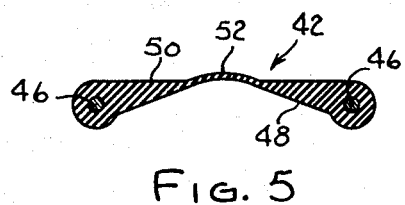
Fig. 5 is a section through a conveyor flight.

As may be seen most clearly in Figs. 4 and 5, the corn cobs 44 are adapted to rest between adjacent conveyor flights and drop into the opening 18 as the flights start around the idler sprocket 38. The V-shaped flights insure proper spacing of the cobs for proper timing. Each flight is comprised of a rubber member having relatively thick longitudinal edges through which mounting pins 46 project and having a generally decreasing or tapered cross section toward the center line of the flight. It will be noted that taper is confined to the underside or non-exposed face 48 of each flight while the upper or exposed surface 50 is generally flat so that the reduced thickness portion along the center line lies in a plane parallel to and spaced apart from the plane containing the mounting pins 46. Therefore if the mounting pins are moved toward each other the natural tendency is to bend the flight outwardly away from the chain in the desired direction rather than possibly bending inwardly. This tendency to bend outwardly is further enhanced by the slightly curved portion 52 along the center line of the exposed face. The additional stiffness provided by this portion resists bending inwardly while readily permitting the flight to be bent outwardly as shown. These precautions are taken since there is a tendency of the flights to flatten out as they pass over the sprocket wheels as may be seen in Fig. 4. As seen in Fig. 4 the flight passing over the sprocket has not completely flattened out but it will be appreciated that if manufacturing errors occur the flight may well flatten out when passing over the sprocket. The curved portion 52 on the exposed face of the flight also makes the exterior of the fold sharper when flexed as in Fig. 4 rather than being round as it would otherwise be.

It will be noted that pins 46 support each flight at the upper end of the arm 54 projecting upwardly from the chain connector links 56. Of course mounting each flight at the end of the link arm in this manner increases the tendency of the flight to flatten out as it passes over the sprocket wheel and the tendency could be greatly reduced if the arms were shortened or omitted and other links used. However, the flexure of the flight is deemed to be desirable since it tends to be self-cleaning.

The rubber flights permit corn to be handled without injuring the kernels and are readily cleaned. There are no hinges or other inaccessible spots in which bacteria might breed. This is of great importance since any machinery used in preparing and packaging food must be able to be cleaned easily.

As noted above, the cutting knives are self-adjusting within a given range. If the cob is too small or large, corn is wasted or part of the cob is cut and goes into the pack. The range may be adjusted, however, and in practice the machines may now be set up along a supply conveyor and adjusted so the machine nearest the supply takes the largest diameter with the others taking progressively smaller diameter cobs. Since the feed conveyor eliminates the need for timing and the flights position and space the cobs the operator can direct his attention to selection of the proper size cobs. This is reflected in less waste and increased quality. In the old practice the operator seldom looked at the cobs passing on the conveyor and concentrated on placement and timing, thus feeding the machine a wide range of sizes.

Although but one embodiment of the present invention has been illustrated and described, it will be apparent to those skilled in the art that various changes and modifications may be made therein without departing from the spirit of the invention or from the scope of the appended claims.

I claim:

1. A flexible conveyor flight having a generally flat surface and being thinner along its longitudinal axis, a pin passing through each longitudinal edge, a plane containing said pin being parallel and spaced from said surface so movement of the pins towards each other will flex the flight in a V shape with said surface on the outside, a longitudinal ridge on said surface, said ridge having a rounded surface and serving to resist flexure in one direction.

2. A conveyor flight comprising, a flexible member having a reduced thickness along its longitudinal axis, a mounting pin passing through each longitudinal edge, said mounting pins being in a plane offset from said axis so the flight tends to flex away from said plane as the pins move towards each other, a stiffening rib along said axis on the side of the member remote from said plane to resist flexure toward said plane.

3. A flexible conveyor flight which, when not flexed, has a generally flat exposed or upper surface and a lower or unexposed surface which tapers from the longitudinal axis of the flight to each of its longitudinal edges, and pins passing through said edges and lying in a plane parallel and spaced from the plane of the upper surface so that the flight flexes upwardly when the pins are moved toward each other, said flight being adapted to be flexed in a generally V shape along the run of a conveyor and to tend to flatten out when passing over a conveyor or sprocket.

4. A conveyor flight according to claim 3 including a stiffening portion along said centerline on said upper surface for resisting flexure downwardly while allowing flexure upwardly.

5. A conveyor flight comprising, a rubber member having a generally flat surface and gradually increasing in thickness from the centerline of the surface to the edges parallel to the centerline so the surface opposite the flat surface is in the form of a flattened V, and a pin passing through the thickened portion edjacent each edge and being so located that a plane passing through the pins lies outside of said member in the proximity of the centerline.

References Cited in the file of this patent

UNITED STATES PATENTS

| Number | Name | Date |
|---|---|---|
| 1,379,207 | O'Quinn | May 24, 1921 |
| 2,011,514 | Dickinson | Aug. 13, 1935 |
| 2,024,391 | Schmidt | Dec 17, 1935 |
| 2,029,344 | Sheldon | Feb. 4, 1936 |
| 2,279,207 | Schenk | Apr. 7, 1942 |